(12) United States Patent
Wiencke

(10) Patent No.: US 10,740,105 B2
(45) Date of Patent: Aug. 11, 2020

(54) PROCESSOR SUBROUTINE CACHE

(71) Applicant: Texas Instruments Incorporated, Dallas, TX (US)

(72) Inventor: Christian Wiencke, Garching (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 899 days.

(21) Appl. No.: 14/245,667

(22) Filed: Apr. 4, 2014

(65) Prior Publication Data
US 2015/0286484 A1 Oct. 8, 2015

(51) Int. Cl.
- G06F 9/38 (2018.01)
- G06F 9/30 (2018.01)
- G06F 12/0875 (2016.01)

(52) U.S. Cl.
CPC ........ *G06F 9/3808* (2013.01); *G06F 9/30054* (2013.01); *G06F 12/0875* (2013.01); *G06F 2212/452* (2013.01); *Y02D 10/13* (2018.01)

(58) Field of Classification Search
None
See application file for complete search history.

(56) References Cited

U.S. PATENT DOCUMENTS

2005/0125632 A1* 6/2005 Alsup .................. G06F 9/3802
712/207
2008/0114964 A1* 5/2008 Davis .................. G06F 9/3808
712/2
2010/0318972 A1* 12/2010 Xu ........................ G06F 9/3808
717/128

FOREIGN PATENT DOCUMENTS

CN          1890631 A       3/2007

OTHER PUBLICATIONS

P.R.C. Search Report dated Nov. 29, 2018.

* cited by examiner

*Primary Examiner* — John M Lindlof
(74) *Attorney, Agent, or Firm* — Brian D. Graham; Charles A. Brill; Frank D. Cimino

(57) ABSTRACT

A processor includes an execution unit and a subroutine cache. The execution unit is configured to execute instructions. The subroutine cache us configured to provide instructions of a subroutine to the execution unit for execution. The subroutine cache includes subroutine instruction storage, a subroutine address register, and subroutine cache control logic. The subroutine control logic is configured to: identify a subroutine call instruction provided to the execution unit; determine whether an instruction of a subroutine invoked by the subroutine call instruction is stored in the subroutine instruction storage by evaluating a subroutine validity indicator that indicates whether at least a portion of the subroutine is stored in the subroutine instruction storage; and provide the instruction of the subroutine to the execution unit based on the subroutine validity indicator indicating that at least a portion of the subroutine is stored in the subroutine instruction storage.

20 Claims, 3 Drawing Sheets

PROCESSOR SUBROUTINE CACHE

BACKGROUND

In computer technology, a subroutine (also known as a procedure, function, routine, method, etc.) is a set of instructions within a larger program that performs a specific task and is relatively independent of the remaining program code. A subroutine operates as a computer sub-program that is one step in a larger program. A subroutine is often implemented so that it can be started ("called") several times and/or from several places during execution of the program, including from other subroutines, and then branch back (return) to the next instruction of the calling program after execution of the subroutine is complete.

When a subroutine is executed more than once by a computer or processor, the instructions of the subroutine may be read multiple times from instruction memory. Repeated access of memory to fetch subroutine instructions increases energy consumption. Additionally, execution of the subroutine call and return instructions may cause the processor pipeline to stall while fetching the call/return destination instructions from the instruction memory. Stall cycles reduce processor performance. Thus, while incorporation of subroutines effectively can reduce program size and improve program organization, subroutine execution can detrimentally affect processor performance.

SUMMARY

A processor and subroutine cache for accelerating subroutine execution and reducing system energy use are disclosed herein. In one embodiment, a processor includes an execution unit and a subroutine cache. The execution unit is configured to execute instructions. The subroutine cache us configured to provide instructions of a subroutine to the execution unit for execution. The subroutine cache includes subroutine instruction storage, a subroutine address register, and subroutine cache control logic. The subroutine cache control logic is configured to: identify a subroutine call instruction provided to the execution unit; determine whether an instruction of a subroutine invoked by the subroutine call instruction is stored in the subroutine instruction storage by evaluating a subroutine validity indicator that indicates whether at least a portion of the subroutine is stored in the subroutine instruction storage; and provide the instruction of the subroutine to the execution unit based on the subroutine validity indicator indicating that at least a portion of the subroutine is stored in the subroutine instruction storage.

In another embodiment, a method includes decoding, by a processor, a subroutine call instruction that specifies a register of the processor containing a start address of a subroutine. The method also includes evaluating, by the processor, a subroutine validity indicator that indicates: whether at least a portion of the subroutine is stored in a subroutine instruction memory of the processor, and whether the start address of the subroutine is stored in the register of the processor. The method further includes providing an instruction of the subroutine from the subroutine instruction memory to an execution unit of the processor based on the evaluating determining that the subroutine validity indicator indicates that the subroutine is stored in the subroutine instruction memory.

In a further embodiment, a subroutine cache includes subroutine instruction storage, a subroutine address register, a subroutine validity indicator, and subroutine cache control logic. The subroutine instruction storage is for storing instructions of a subroutine. The subroutine address register is for storing an address of the subroutine. The subroutine validity indicator is for storing a value that indicates: whether at least a portion of the subroutine is stored in the subroutine instruction storage; and whether the address of the subroutine is stored in the subroutine address register. The subroutine cache control logic is configured to: identify a subroutine call instruction provided to an execution unit of a processor; determine whether instructions of the subroutine invoked by the subroutine call instruction are stored in the subroutine instruction storage by evaluating the value stored in the subroutine validity indicator; and provide the instructions of the subroutine to the execution unit based on the value stored in the subroutine validity indicator.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
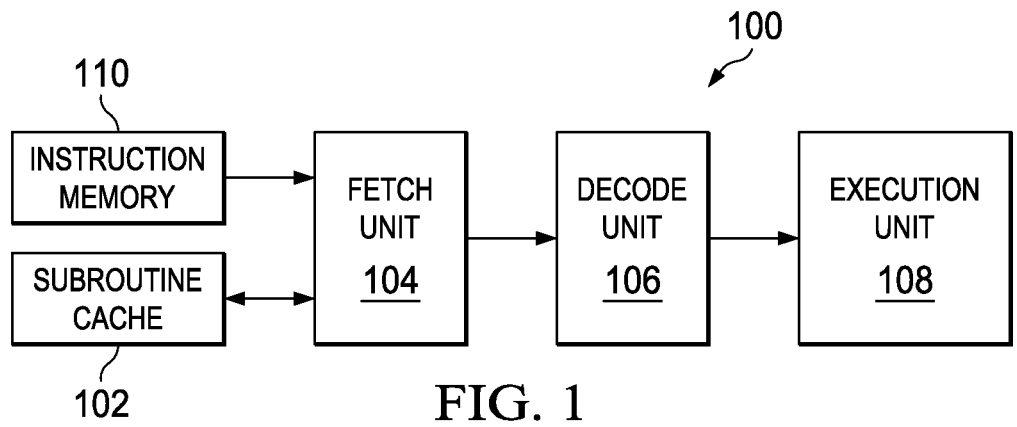
FIG. 1 shows a block diagram of a processor in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of additional factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Conventional processors often include general purpose internal or external instruction caches. Use of such caches can reduce memory energy consumption and increase processor performance (by reducing the number of stall cycles) relative to processors that lack caching. Conventional caches include storage for instructions and addresses, and address comparison logic that compares fetch addresses with the stored addresses. Depending on the cache architecture (e.g., the number of associative sets supported by the cache), the number of stored addresses and address comparators differs. In the case of subroutine calls, conventional caches typically need multiple separate associative cache ways (associative cache sets) to support multiple subroutines, which requires address storage and comparators per associative cache way.

Some conventional caches include a relatively large number of address storage locations and address comparators. Such caches can provide a high cache hit rate (i.e., a large number of subroutines can be cached), but implementing the storage and comparators results in a high cache gate count and a high cache energy consumption. Other conventional cache implementations include few address storage locations and address comparators resulting in a lower cache hit rate, lower cache gate count, and lower cache energy consumption. Thus, conventional caches present a compromise between improving cache hit rate and reducing cache circuitry and energy consumption.

Embodiments of the present disclosure include a subroutine cache that provides a high subroutine call cache hit rate while reducing circuitry and energy consumption relative to conventional cache architectures. The subroutine cache disclosed herein employs register-based subroutine calls, and register index value comparison or flag multiplexing, rather than the address comparison logic to identify a cached subroutine. As a result, when compared to conventional caches, the subroutine cache disclosed herein offers a substantial reduction in cache power consumption and gate count without reducing cache performance.

FIG. 1 shows a block diagram of a processor 100 in accordance with various embodiments. The processor 100 may be a general purpose microprocessor, a digital signal processor, a microcontroller, or other computing device that executes instructions retrieved from an instruction memory 110. The processor 100 includes a fetch unit 104, a decode unit 106, an execution unit 108, and a subroutine cache 102. The fetch unit 104 retrieves instructions from the instruction memory 110 for execution by the processor 100. The instruction memory 110 is a storage device, such as a random access memory (volatile or non-volatile) that stores instructions to be executed. The instruction memory 110 may be an internal component of the processor 100, or alternatively may be external to the processor 100. The fetch unit 104 provides the retrieved instructions to the decode unit 106.

The decode unit 106 examines the instructions received from the fetch unit 104, and translates each instruction into controls suitable for operating the execution unit 108, processor registers, and other components of the processor 100 to perform operations that effectuate the instructions. In some embodiments of the processor 100, various operations associated with instruction decoding may be performed in the fetch unit 104 or another operational unit of the processor 100 to facilitate efficient instruction execution. The decode unit 106 provides control signals to the execution unit 108 that cause the execution unit 108 to carry out the operations needed to execute each instruction.

The execution unit 108 includes arithmetic circuitry, shifters, multipliers, registers, logical operation circuitry, etc. that are arranged to manipulate data values as specified by the control signals generated by the decode unit 106. Some embodiments of the processor 100 may include multiple execution units that include the same or different data manipulation capabilities.

The processor 100 may include various other components that have omitted from FIG. 1 as a matter of clarity. For example, embodiments of the processor 100 may include registers, instruction and/or data caches, additional memory, communication devices, interrupt controllers, timers, clock circuitry, direct memory access controllers, and various other components and peripherals.

The subroutine cache 102 is coupled to the fetch unit 104. The subroutine cache 102 provides storage for instructions of subroutines fetched or pre-fetched from the instruction memory 110. In contrast to a conventional instruction cache that may store any instructions fetched from the instruction memory 110, the subroutine cache 102 stores only instructions of subroutines (e.g., subroutines selected for caching during program construction). Because the subroutine cache 102 can provide instructions of a subroutine stored in the cache 102 with less delay than the instruction memory 110 can provide the instructions, by storing subroutine instructions in the subroutine cache 102, the processor 100 can provide improved execution performance and reduced energy consumption. For example, execution of a subroutine call to a subroutine stored in the subroutine cache 102 may not introduce stall cycles in the processor 100.

Figure 2:
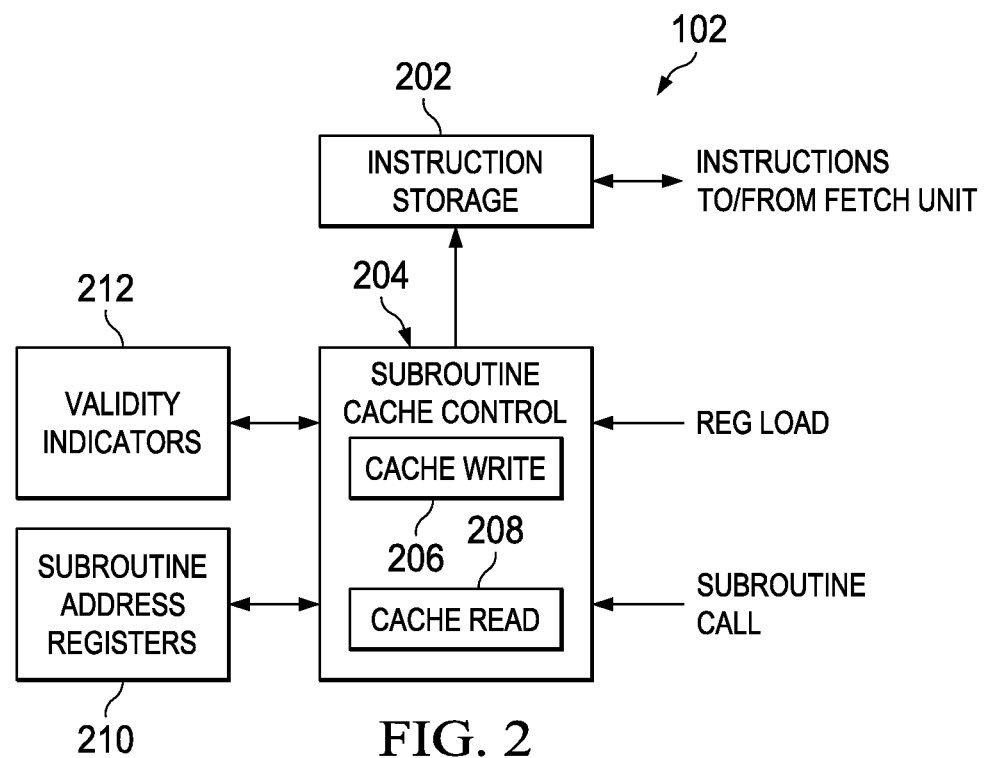
FIG. 2 shows a block diagram of a subroutine cache in accordance with various embodiments.

FIG. 2 shows a block diagram of the subroutine cache 102. The subroutine cache 102 includes instruction storage 202, subroutine cache control logic 204, subroutine address registers 210, and cache validity indicators 212. The instruction storage 202 includes random access memory that stores instructions of subroutines fetched from the instruction memory 110. In some embodiments, the instruction storage 202 may be subdivided in a number of cache blocks where each cache block stores instructions of a subroutine.

The subroutine cache control logic 204 includes cache write control logic 206 and cache read control logic 208. The cache write control logic 204 controls the writing of subroutine instructions fetched from instruction memory 110 into the cache instruction storage 202. The cache read control logic 206 controls the retrieval of subroutine instructions from the instruction storage 202 for execution.

The subroutine address registers 210 include registers that are loaded with the address (e.g., the address in instruction memory 110) of each subroutine stored in the subroutine cache 102. The subroutine address registers 210 may be general purpose registers of the processor 100 or registers dedicated exclusively to storage of subroutine addresses. The number and width of address registers included in the subroutine address registers 210 may vary for different embodiments of the subroutine cache 102.

The cache validity indicators 212 signify whether instructions of called subroutines are stored in the instruction storage 202. In some embodiments, the valid indicators 212 may be flags where each of the flags corresponds to one of the subroutine address registers 210. The flag, if set indicates that a corresponding one of the subroutine address registers 210 has been loaded with the address of a subroutine, and that instructions of the subroutine are stored in the instruction storage 202. The flag may be set when execution of an instruction by the processor 100 loads the address of a subroutine into the corresponding subroutine address register 210 and instructions of the subroutine have been fetched by the fetch unit 104 and stored in the instruction storage 202. The flag may be reset, indicating that instructions of a subroutine are not stored in the subroutine cache 102, when an instruction executed by the processor 100 writes to the subroutine address register 210 corresponding to the flag.

In embodiments of the processor 100, subroutines are called by loading the address of the subroutine into one of the subroutine address registers 210, and thereafter calling the subroutine by executing a call instruction that references the subroutine address register 210 storing the address of the called subroutine. When a subroutine call instruction referencing a subroutine address register 210 is executed, the cache read logic 208 checks the validity indicator 212 corresponding to the referenced subroutine address register 210. If the validity indicator 212 signifies that the instructions of the called subroutine are stored in the instruction storage 102, then the cache read logic 208 reads instructions of the called subroutine from the instruction storage 102, and provides the cached instructions to the fetch unit 104, and/or the decode unit 106 and the execution unit 108 for execution. Because the instructions are provided from the subroutine cache 102, the fetch unit 104 need not retrieve the instructions from the instruction memory 110.

If the validity indicators 212 are implemented as flags, as described above, the cache read logic 208 may include selection logic, such as a multiplexer, that selects a validity flag corresponding to a referenced subroutine address register 210 to determine whether the subroutine cache 102 contains instructions of the called subroutine. Thus, the validity indicator flags are inputs to the multiplexer, the index of the subroutine address register 210 referenced by the subroutine call instructions is the control input to the multiplexer, and the value of the validity indicator flag corresponding to the referenced subroutine address register 210 is output by the multiplexer.

If, when a subroutine call instruction is executed, the validity indicator 212 corresponding to the referenced subroutine address register 210 signifies that instructions of the called subroutine are not stored in the instruction storage 202, then the cache write logic 206 stores the instructions of the subroutine in the subroutine storage 202 as the instructions are fetched from the instruction memory 110 by the fetch unit 104. Thereafter, the instructions of the subroutine stored in the instruction storage 202 are provided for execution, as described above, when the subroutine is called.

In some embodiments of the subroutine cache 102, the validity indicators 212 include one or more registers, each of which stores a value indicative of (e.g., an index of) a subroutine address register 210 containing the address of a subroutine and referenced to call the subroutine. For example, if four subroutine address registers 210 are provided, then a register of the validity indicators 212 may be two bits in width to support index values 0-3. When a subroutine call instruction referencing a subroutine address register 210 is executed, the fetch unit 104 identifies the call instruction, and passes the instruction, or parameters thereof, to the subroutine cache 102. In the subroutine cache 102, the cache read logic 208 compares the index value of the referenced subroutine address register 210 to the values stored in each of the validity indicator registers. If the value of the index of the subroutine address register 210 is equal to a value stored in one of the validity indicator registers, then the instructions of the called subroutine are stored in the instruction storage 102, and the cache read logic 208 reads instructions of the called subroutine from the instruction storage 102 for execution. For example, if a CALL R2 instruction is executed, the cache read logic 208 compares a value indicative of R2 (e.g. 2) to the value stored in each of the validity indicator registers. If one of the validity indicator registers contains the value "2," then the cache read logic 208 deems the subroutine cache 102 to store instructions of the called subroutine. The cache read logic 208 may include one or more comparators to compare the index value of the referenced subroutine address register 210 to the value stored in each of the validity indicator registers. Because the validity indicator registers are narrow compared to the address comparators employed in conventional instruction caches, the index comparators can be substantially smaller than the address comparators used in conventional instruction caches.

In embodiments employing validity indicator registers as the validity indicators 212, a validity indicator register may be loaded with a subroutine address register index value when a subroutine address is loaded into a subroutine address register 210 and instructions of a called subroutine are stored in the instruction storage 202. After the subroutine is called, and the instructions of the subroutine are stored in the instruction storage 202, the validity indicator register contains the subroutine address register index value indicating that the subroutine is stored in the subroutine cache 102 until the validity indicator register is overwritten by execution of a subroutine address register load instruction.

The validity indicators may further include a value specifying the number of valid instructions of each subroutine stored in the instruction storage 202. Based on that value the cache read logic 208 can control how many instructions of a subroutine are provided from the instruction storage 202 and which instructions must be read from the instruction memory 110. Thus, embodiments advantageously allow partial storing and providing of subroutines. For example if execution and caching of a subroutine is preempted by execution of an interrupt service, the subroutine may be partially cached.

Some less complex embodiments of the subroutine cache 102 may be limited to providing sequential instructions of a sub routine from the instruction storage 202. More complex embodiments may also allow the execution of discontinuities, such as loops, if-then, if-then-else structures, etc., from the instruction storage 202. The cache read control logic 208 may include a pointer to instruction words in the cache and pointer arithmetic logic that adjusts the pointer to reference a jump/branch instruction destination location in the cache (e.g., based on the offset provided in the jump/branch instruction). Using the adjusted pointer, the cache read control logic 208 provides the instructions at the destination location for execution when a conditional construct, such as a condition jump/branch instruction is executed in a cached subroutine.

Figure 3:
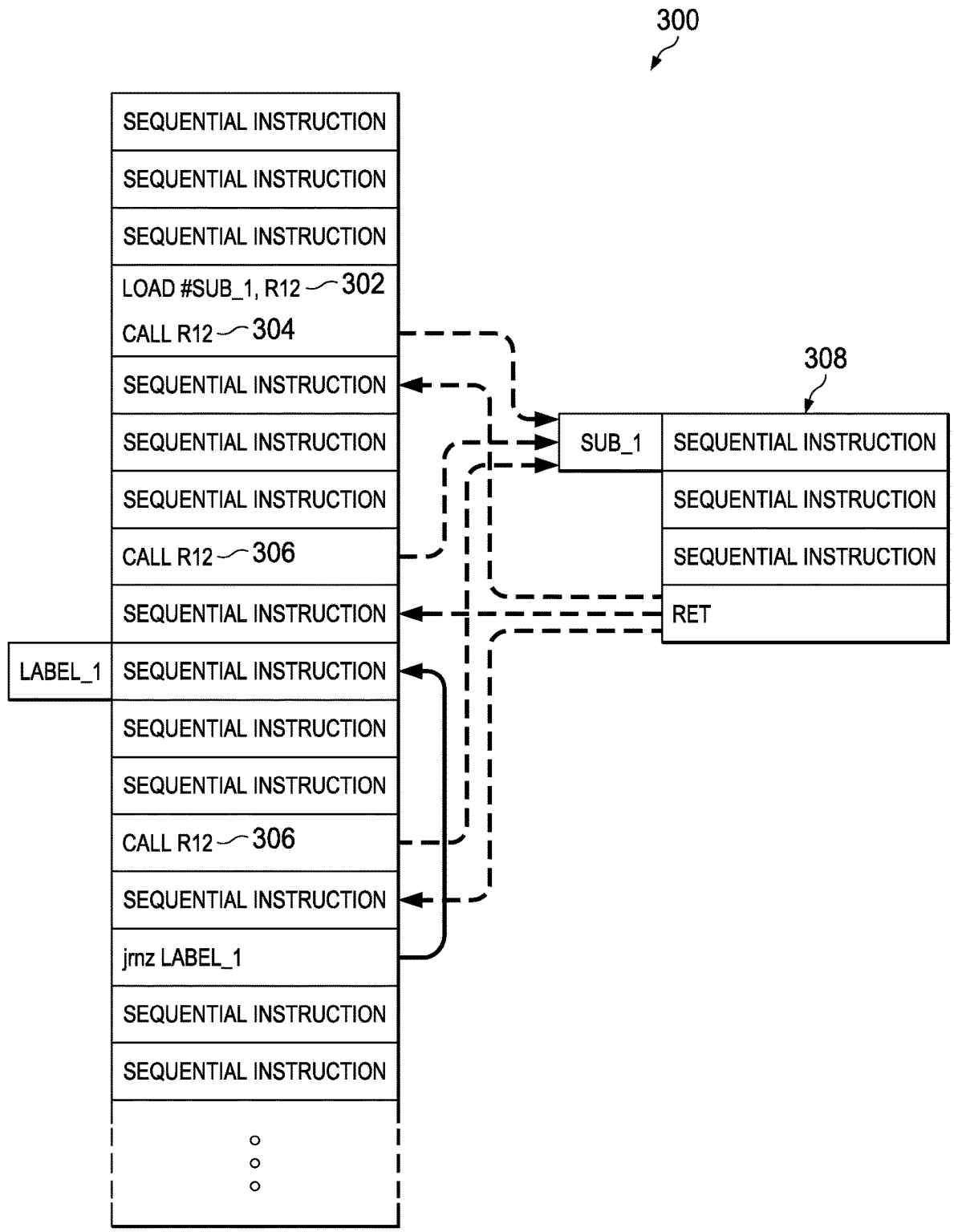
FIG. 3 shows a shows a program segment that includes subroutine calls in accordance with various embodiments.

FIG. 3 shows a program segment 300 that includes subroutine calls executed by the processor 100. When the instruction sequence 300 is built by a software development tool, such as a compiler, the tool generates subroutine call instructions that reference a register that contains the address of the subroutine. Accordingly, the tool includes an instruction that loads the address of the subroutine into the referenced register before the first call of the subroutine. In the program segment 300, instruction 302, when executed by the processor 100, loads the start address of a subroutine (SUB_1) into register R12 of the processor 100. Register R12 is a subroutine address register 210. When subroutine call instruction 304 (CALL R12) is executed, the cache read logic 208 checks the validity indicators 212 and determines that the subroutine SUB_1 308 is not stored in the subroutine cache 102 because instructions of SUB_1 308 have not been previously fetched and loaded into instruction storage 202. The fetch logic 104 retrieves the subroutine SUB_1 308 from instruction memory 110, and the cache write logic 206 stores the instructions 308 in the instruction storage 202. The validity indicator 212 corresponding to subroutine address register R12 is set when instructions of SUB_1 308 are cached.

When subroutine call instruction 306 (CALL R12) is executed, the cache read logic 208 checks the validity indicators 212 and determines that the subroutine SUB_1 308 is stored in the subroutine cache 102. The instructions of SUB_1 308 are provided from the instruction storage 202 for execution.

Figure 4:
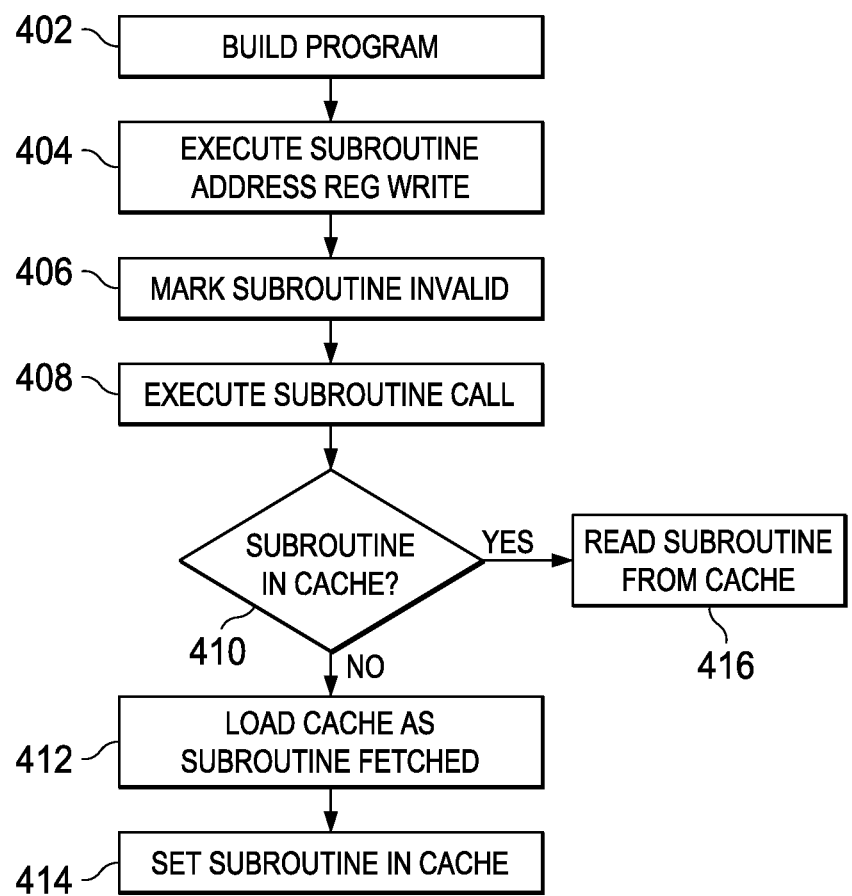
FIG. 4 shows a flow diagram for a method for subroutine caching and execution in accordance with various embodiments.

FIG. 4 shows a flow diagram for a method for subroutine caching and execution in accordance with various embodiments. Though depicted sequentially as a matter of convenience, at least some of the actions shown can be performed in a different order and/or performed in parallel. Additionally, some embodiments may perform only some of the actions shown.

In block 402, a software development system, e.g., a computer executing a software development tool such as a compiler, generates executable instructions for a program 300 that includes subroutine calls 304, 306. The system generates the subroutine call instructions as calls to a register (e.g., R12) that contains the address of the subroutine. Accordingly, the development system includes in the executable instructions 300 an instruction 302 that loads the address of a called subroutine 308 into a register prior to a first instruction 304 calling the subroutine 308.

In block 404, the instructions 300 generated by the software development system are stored in the instruction memory 110 and are being executed by the processor 100. An instruction 302 executed by the processor 100 writes a value into a subroutine address register 210. The register 210 may be a general purpose register of the processor 100 or a register dedicated to use as a subroutine address register. The write to the subroutine address register may cause the subroutine cache 102 to mark cache entries associated with the register invalid. Accordingly, a validity indicator 212 corresponding to the register 210 may be reset in block 406.

In block 408, a subroutine call referencing a subroutine address register 210 is executed. The subroutine cache 102 checks the validity indicator 212 corresponding to the referenced subroutine address register 210 in block 410 to determine whether the called subroutine is stored in the subroutine cache 102. The validity indicator 212 may be implemented as flags, where each flag corresponding to one subroutine address register 210, or as registers storing index values of the subroutine address registers 210 referenced by subroutine call instructions.

If the validity indicators 212 signify that the called subroutine is stored in the subroutine cache 102, then the instructions of the subroutine are read from the subroutine cache and executed in block 416.

If the validity indicators 212 signify that the called subroutine is not stored in the subroutine cache 102, then the instructions of the subroutine are read from instruction memory 110 and stored in the subroutine cache in block 412. In block 414, the validity indicator 212 corresponding to the subroutine is set to indicate that the subroutine is stored in the subroutine cache 102.

Embodiments of the subroutine cache 102 may be applied to accelerate subroutine execution for subroutines that can be completely stored in the subroutine cache 102, and to accelerate execution of subroutines that are too long to be completely stored in the subroutine cache 102. If the subroutine is too long to be completely stored in the subroutine cache 102, then the initial instructions (i.e., instructions beginning as the subroutine start address) are stored in the instruction cache. Accordingly, the subroutine call may executed without stall cycles, and while the initial instructions of the subroutine are executed from the subroutine cache, additional instructions of the subroutine may be pre-fetched from instruction memory 110 and executed without delay after the cached instructions are executed.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processor, comprising:
a fetch unit configured to receive a set of instructions;
an execution unit configured to execute the set of instructions; and
a subroutine cache comprising:
subroutine instruction storage;
a set of subroutine address registers, each configured to store an address at which a subroutine is stored within the subroutine instruction storage;
a set of subroutine validity indicators, each corresponding to a respective one of the set of subroutine address registers; and
subroutine cache control logic configured to:
receive, from the fetch unit, a load instruction of the set of instructions that specifies a first subroutine and a first subroutine address register of the set of subroutine address registers;
in response to the load instruction, store, in the first subroutine address register, a first address at which the first subroutine is to be stored in the subroutine instruction storage;
receive, from the fetch unit, a subroutine call instruction of the set of instructions that specifies the first subroutine address register; and
in response to the subroutine call instruction, provide at least a portion of the first subroutine from the subroutine instruction storage to the execution unit, based on the first subroutine address register and a first validity indicator of the set of subroutine validity indicators indicating that the at least a portion of the first subroutine indicated by the first subroutine address register is stored in the subroutine instruction storage.

2. The processor of claim 1, wherein the subroutine cache control logic is configured to, in response to the subroutine call instruction:
determine that the first subroutine invoked by the subroutine call instruction is not stored in the subroutine instruction storage; and
store the at least a portion of the first subroutine fetched from memory in the subroutine instruction storage.

3. The processor of claim 1, wherein the first subroutine address register is a general purpose register of the processor or a dedicated subroutine address storage register.

4. The processor of claim 1, wherein the subroutine cache control logic is configured to store of the first subroutine in the subroutine instruction storage responsive to the first validity indicator indicating that the first subroutine is not stored in the subroutine instruction storage.

5. The processor of claim 1, wherein the subroutine cache control logic is configured to set the first validity indicator to a value that indicates that the first subroutine is not stored in the subroutine instruction storage responsive to the execution unit writing to the first subroutine address register.

6. The processor of claim 1, wherein the first validity indicator comprises a subroutine validity register for storing an identifier of the first subroutine address register; and wherein the subroutine cache control logic comprises:
   a comparator configured to compare the identifier stored in the subroutine validity register to a register value included in the subroutine call instruction;
   wherein the subroutine cache control logic is configured to:
      load a value identifying the first subroutine address register into the subroutine validity register responsive to loading the first address of the first subroutine into the first subroutine address register; and
      compare, using the comparator, the value stored in the subroutine validity register to a register value included in the subroutine call instruction on invocation of the subroutine.

7. The processor of claim 1, wherein the subroutine cache control logic includes:
   a multiplexer having inputs coupled to the set of subroutine validity indicators and configured to select between the set of subroutine validity indicators based on the subroutine call instruction.

8. The processor of claim 1, wherein:
   the first validity indicator is further configured to store a value specifying a number of instructions of the first subroutine stored within the subroutine instruction storage; and
   the at least a portion of the first subroutine provided from the subroutine instruction storage by the subroutine cache control logic is based on the stored value specifying the number of instructions.

9. The processor of claim 5, wherein the subroutine cache control logic is further configured to set the first validity indicator to the value that indicates that the subroutine is not stored in the subroutine instruction storage responsive to the execution unit writing data to the first subroutine address register that is not a subroutine start address.

10. The processor of claim 1, wherein the subroutine cache control logic is configured to, in response to the load instruction, set the first validity indicator to indicate that the first subroutine is not stored in the first subroutine address register.

11. A method, comprising:
   receiving a load instruction that specifies a subroutine and a subroutine address register of a processor;
   in response to the load instruction, storing, in the subroutine address register, an address at which a subroutine is to be stored in a subroutine instruction storage;
   receiving a subroutine call instruction that specifies the subroutine address register; and
   in response to the subroutine call instruction, providing at least a portion of the subroutine from the subroutine instruction storage to an execution unit of the processor based on a subroutine validity indicator, associated with the subroutine address register indicating that the subroutine indicated by the subroutine address register is stored in the subroutine instruction storage.

12. The method of claim 11, further comprising:
   determining, by a code generation system, whether the subroutine is called at least a predetermined number of times within a program segment; and
   encoding, by the code generation system, calls to the subroutine by referencing the subroutine address register based on the subroutine being called at least the predetermined number of times within the program segment.

13. The method of claim 11, further comprising:
   in response to the load instruction, setting the subroutine validity indicator to indicate that the subroutine is not stored in the subroutine instruction storage; and
   in response to the subroutine call instruction, setting the subroutine validity indicator to indicate the subroutine is stored in the subroutine instruction storage responsive to:
      determining that the subroutine invoked by the subroutine call instruction is not stored in the subroutine instruction storage; and
      storing an instruction of the subroutine in the subroutine instruction storage.

14. The method of claim 11, wherein the subroutine address register of the processor is a general-purpose register or a dedicated subroutine address storage register of the processor.

15. The method of claim 11, further comprising storing the subroutine in the subroutine instruction storage responsive to a value of the subroutine validity indicator indicating that the subroutine is not stored in the subroutine instruction storage.

16. The method of claim 11, further comprising setting the subroutine validity indicator to a value that indicates that the subroutine is not stored in the subroutine instruction storage responsive to the execution unit writing to a subroutine address register associated with the subroutine validity indicator.

17. A subroutine cache, comprising:
   subroutine instruction storage;
   a subroutine address register;
   a subroutine validity indicator corresponding to the subroutine address register; and
   subroutine cache control logic configured to:
      receive a load instruction that specifies a subroutine and the subroutine address register;
      in response to the load instruction, store, in first subroutine address register, an address at which the subroutine is to be stored in the subroutine address register;
      receive a subroutine call instruction that references the subroutine address register; and
      in response to the subroutine call instruction, provide at least some instructions of the subroutine from the subroutine instruction storage to an execution unit, in response to determining that an instruction of the subroutine invoked by the subroutine call instruction is stored in the subroutine cache, based on the subroutine validity indicator indicating that the subroutine is stored in the subroutine instruction storage.

18. The subroutine cache of claim 17, wherein the subroutine cache control logic is configured to:
   in response to the load instruction, set the subroutine validity indicator to indicate that the subroutine is not stored in the subroutine cache; and
   in response to the subroutine call instruction and based on the subroutine validity indicator indicating that the subroutine is not stored in the subroutine cache:
      store, in the subroutine instruction storage, instructions of the subroutine fetched from memory, and
      set the subroutine validity indicator to a value indicating that the subroutine is stored in the subroutine cache.

19. The subroutine cache of claim 17, wherein the subroutine cache control logic is configured to reset the subroutine validity indicator to a value that indicates that the subroutine is not stored in the subroutine instruction storage responsive to the execution unit writing to the subroutine address register.

20. The subroutine cache of claim 17, wherein the subroutine validity indicator comprises a subroutine validity register for storing an identifier of the subroutine address register; and the subroutine cache comprises:
- a comparator configured to compare the identifier stored in the subroutine validity register to a register value included in the subroutine call instruction;
- wherein the subroutine cache control logic is configured to:
  - load the identifier of the subroutine address register into the subroutine validity register responsive to loading the address of the subroutine into the subroutine address register; and
  - compare, using the comparator, the identifier stored in the subroutine validity register to a register value included in the subroutine call instruction on invocation of the subroutine.

* * * * *